United States Patent

Lamy

[11] 4,052,862
[45] Oct. 11, 1977

[54] METHOD OF SUBMERGING PIPELINES

[75] Inventor: Jacques Edouard Lamy, Fontenay-aux-Roses, France

[73] Assignee: Compagnie Generale pour les Developpements Operationnels des Richesses Sous-Marines "C.G. Doris", Paris, France

[21] Appl. No.: 690,873

[22] Filed: May 28, 1976

[30] Foreign Application Priority Data

May 30, 1975 France .................. 75.16962

[51] Int. Cl.² .............................................. F16L 1/00
[52] U.S. Cl. ...................................... 61/112; 61/110; 138/111; 138/112; 138/113
[58] Field of Search ................. 61/107, 112, 110, 114; 138/111, 112, 113

[56] References Cited

U.S. PATENT DOCUMENTS

| 3,086,369 | 4/1963 | Brown | 61/112 X |
| 3,311,132 | 3/1967 | McWilliams | 61/112 X |
| 3,466,881 | 9/1969 | Lamy | 61/112 X |
| 3,909,756 | 9/1975 | Ritchie | 138/111 X |

Primary Examiner—Jacob Shapiro
Attorney, Agent, or Firm—Laurence R. Brown

[57] ABSTRACT

The invention consists of a method and apparatus for laying a pipeline, such as an oil duct or a gas duct, in a body of water, wherein the pipeline, or a section thereof, is enclosed within a ballast tube such that an intermediate space is formed between the pipeline or pipeline section and the ballast tube, said space being filled with a liquid less dense than water, such as a light hydrocarbon, while the pipeline is being laid, but may be filled, after the pipeline has been laid, with soft water or with a liquid heavier than water such as a grouting having a base of a hydraulic or hydrocarbon binder. The invention also comprises the provision of a plug at one end of an assembly of pipeline section and ballast tube whereby a free end of said assembly may be secured as by welding to a second assembly of pipeline section and ballast tube at a position remote from the liquid contained in the intermediate space in said first assembly.

12 Claims, 4 Drawing Figures

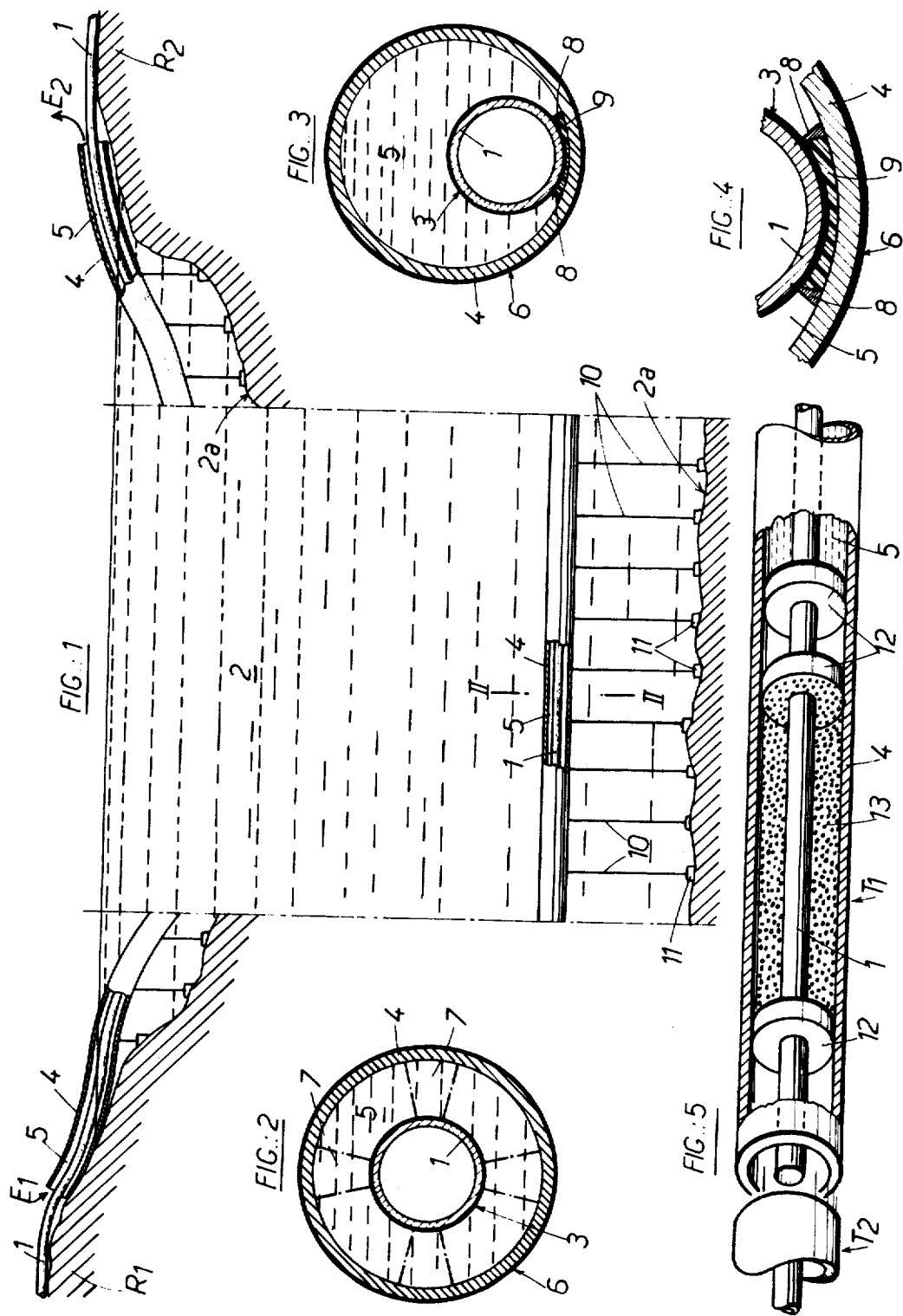

METHOD OF SUBMERGING PIPELINES

The present invention relates to the laying of a pipeline such as an oil duct or a gas duct, in a body of water.

Whatever method is employed for such laying, whether it be by traction from a shore towards open water or by submersion from the surface of the water from a floating device, buoyancy elements, such as floats, are normally associated with the pipeline to give it a positive buoyancy, as well as cables or ballasting chains resting on the bed of the body of water. The pipeline thus floats, at least temporarily, between two waters.

When the whole of the pipeline is in position and is to go into service (for example for the transport of petroleum or natural gas), its buoyancy is destroyed by releasing its floats or filling them with water. The pipeline then comes to rest on the bed. In certain cases, particularly in very deep water, it is nevertheless preferred to maintain a permanent buoyancy at a desired distance from the free surface of the water.

In a general manner, the present invention aims to improve the conditions of laying and of using the pipeline, particularly so far as the creation and possible destruction of its buoyancy are concerned. More particularly, it has the aim of improving the protection of the pipeline against an environment that is relatively corrosive with time (constituted by the body of water) and equally, at least in certain cases, to reduce the risk of implosion of the pipeline due to the depth of its submersion.

To this effect, according to the invention, the pipeline is enclosed for the whole of its length within a continuous ballast tube and as laying of the assembly of pipeline and ballast tube proceeds, the space between the pipeline and ballast tube is filled, at least temporarily, with a liquid less dense than water, consisting preferably of a light hydrocarbon.

The diameter and wall thickness of the ballast tube are calculated so that, taking into account the low density of said liquid, the assembly of pipeline and ballast tube has a positive buoyancy temporarily, that is to say while it is being laid, or permanently, that is to say after it has been laid, in the case where it is desired that, even in service, the assembly should continue to float between two waters.

Conventional supplementary floats may be added to the ballast tube to increase its buoyancy effect without it being necessary to reduce too much its wall thickness, especially in the case of deep waters.

According to one embodiment applicable to the case where, having been laid along the whole of its course, the assembly of pipeline and ballast tube is to come to rest on the bed of the body of water, the buoyancy of the assembly is destroyed by replacing, in the intermediate space referred to, the less dense liquid by water, preferably soft water, or again by a grouting of the type used in public works to carry out sealings and injections, for example a grouting with a base of water and a hydraulic or hydrocarbon binder such as cement, asphalt or bitumen.

The grouting may be filled with substantially inert materials such as sands, gravels or clays and contain various ingredients for example suitable to facilitate its injection.

When the binder is to be set, the setting time is regulated as a function of the length of the space to be filled in order to avoid premature hardening. For example, one can use a liquid having the following composition:
  Portland Cement 50 kg.
  Sand 0 to 20 kg. according to the length of the pipeline
  Water 19 kg to 16–17 kg (if the sand is absent) and additives — plasticisers and setting retarders of the order of 1 kg. (regulated according to the length injected)

It follows from what has been said that the pipeline is, in all cases, no longer in contact with the body of water (generally sea water) which constitutes a corrosive medium, particularly because of the presence of oxygen in said water, against which the pipeline is usually protected by an appropriate coating. The pipeline now rests solely in contact with the liquid in the intermediate space defined by the ballast tube. Now this liquid (light hydrocarbon or water) is, by nature, or because of its confinement within a closed space, much less corrosive than the body of water. In particular, the water (preferably soft) confined in this closed space, ceases to be corrosive when the small quantity of dissolved oxygen that it initially contains is consumed without being able to be replaced by contact with the body of water. This soft water may also advantageously contain corrosion inhibitors of the water-soluble type.

Furthermore, the fact of maintaining in said intermediate space a liquid less dense than water has the effect of reducing by about 25% the external hydrostatic pressure exerted on the pipeline, which gives advantages both technical (reduction of the risk of implosion) and economic (better production from the pipeline by optimization of the ratio between its diameter and its wall thickness).

All these advantages very largely compensate for the minor disadvantage of a slight loss of buoyancy of the assembly of pipeline and ballast tube, by comparison with an assembly in which the ballast tube is located by the side of the pipeline instead of around it.

The following description, with reference to the attached drawing, given by way of non-limiting example, will enable the method of carrying the invention into effect to be better understood, the particulars contained in both the text and the drawing forming part of said invention.

FIG. 1 is a schematic view, in longitudinal section, showing an assembly of a pipeline and a continuous ballast tube enclosing said pipeline, submerged in a body of water;

FIG. 2 is a view, in transverse section, along the line II — II of FIG. 1;

FIG. 3 is a view, in transverse section, of a variation of the pipeline ballast tube assembly shown in FIG. 2;

FIG. 4 is a view on a larger scale of a detail of FIG. 3;

FIG. 5 is a part view, in longitudinal section, showing the connection of two successive sections of the pipeline/ballast tube assembly.

In FIG. 1, 1 is a pipeline, such as an oil duct or a gas duct, laid in a body of water 2 (such as the sea) between two opposed shores $R_1$ and $R_2$ thereof, by one or the other of the two known methods (traction from the shore towards open water or submersion beneath the surface of the water from a floating device) previously mentioned and adapted to the particular construction according to the invention, as will be described hereafter. It preferably carries (see FIGS. 2 to 4) an external coating 3, for example of a bitumen base, as protection against corrosion.

According to the invention, the pipeline 1 is enclosed for the whole of its length within a continuous ballast tube 4 which defines therewith an intermediate space 5. The ballast tube is also preferably provided with an external coating 6 as a protection against corrosion. As shown in FIG. 2, the pipeline 1 and the ballast tube 4 may be maintained co-axial with each other by means of ribs 7 located in various positions. Alternatively, as shown in FIG. 3, the pipeline may be welded on to the internal surface of the ballast tube. In this case in order to avoid possible wear of the external coating 3 of the pipeline, it may be advantageous to insert, in the region of the interface between the two members, a protective pad or cushion 9 of plastic material, shown in a larger scale in FIG. 4.

In the course of laying the pipeline 1, the intermediate space 5 between the pipeline and the ballast tube 4, is initially filled with a liquid less dense than water, preferably a light hydrocarbon. The pipeline thus assumes a positive buoyancy and is maintained in position, between two waters, by means of cables or ballasting chains 10 possibly carrying, at their lower ends, weights 11 resting on the bed 2a of the body of water. If necessary, the ballast tube 4 may be equipped with conventional supplementary floats (not shown) in order to increase its buoyancy effect, without it being necessary to reduce too much its wall thickness, particularly in the case of deep waters.

When the laying of the pipeline is completed from one shore to the other of the body of water, one can maintain the configuration of the assembly shown in FIG. 1 by leaving the liquid less dense than water in position in the intermediate space 5. This configuration is interesting particularly in waters of great depth. In effect, the pipeline does not then descend to the level of the water bed and furthermore it is only subjected to an appreciably reduced hydrostatic pressure of about three-quarters of the pressure to which it would be subjected if it were in contact with the water. This reduction in hydrostatic pressure correspondingly reduces the risk of implosion of the pipeline and furthermore allows a certain reduction in the thickness of the pipeline wall. These two advantages result in a definite and important economic gain. It goes without saying, of course, that it is necessary, in this case, to protect the outside of the ballast tube 4 against corrosion by contact with the body of water.

On the other hand, particularly in a body of water of slight or average depth, it could be preferred to allow the assembly of pipeline 1 and ballast tube 4 to rest on the bed 2a of the body of water. In this case, the light liquid contained in the intermediate space 5 is replaced by a denser liquid such as water, preferably soft, or a grouting. The circuit for emptying the intermediate space 5 is indicated by the arrows $E_1$ and $E_2$ in FIG. 1. The denser liquid introduced at $E_1$ displaces by density the light liquid which is recovered at the end $E_2$.

Thus, the pipeline 1 is protected, during an important part of its useful life, from corrosive contact with the body of water. If the intermediate space 5 is filled with water (preferably soft), the water is confined within the closed space 5 and ceases to be corrosive as soon as the small quantity of dissolved oxygen that it contained initially has been consumed without being able to be replaced by contact with the body of water. Due to this fact, the life of the pipeline is considerably increased even if, after a certain time, the ballast tube has been gradually corroded by the body of water. Said soft water may furthermore be rendered even less corrosive by the addition of corrosion inhibitors of the water-soluble type.

FIG. 5 relates to a feature of the invention applicable to the case in which the pipeline is laid in successive sections whch are welded to each other. In this case, there in fact exists a risk when welding two successive sections that the light hydrocarbon contained in the intermediate space 5 might catch fire.

This risk is eliminated in the following manner:

The intermediate space 5 between the pipeline and the ballast tube 4 is only filled for a part of its length with the light hydrocarbon in question. There is placed between the free end of a section T, already in position and the hydrocarbon mass already contained in the intermediate space 5 forming part of this section, a separator plug comprising bungs 12 (for example of foamed plastic) and a column 13 of a non-inflammable light liquid consisting, for example, of a suspension in water of microspheres of a plastics material.

It will thus be seen that when one comes to weld a new section $T_2$ on to the previous section $T_1$, the mass of hydrocarbon in the intermediate space 5 is located sufficiently far from the source of heat to eliminate any risk of catching fire.

It will be understood that the embodiments described are only examples and that it would be possible to modify them, notably by the substitution of technical equivalents, without departing from the scope of the invention.

I claim:

1. In a method of laying a pipeline in a body of water having a bed, the improvement comprising the steps of (a) enclosing the pipeline over the whole of its length within a ballast tube such that an intermediate space is created between the pipeline and the ballast tube, (b) filling said intermediate space with a liquid less dense than water, to give the assembly of said pipeline and ballast tube a positive buoyancy while said assembly is being laid, and (c) replacing said liquid in said intermediate space with a medium denser than said liquid, to cause said assembly to rest on said bed.

2. A method according to claim 1, wherein said medium is water.

3. A method according to claim 1, wherein said medium is soft water.

4. A method according to claim 1, wherein said medium contains a corrosion inhibitor.

5. A method according to claim 1, wherein said medium is a grouting having a base of a hydrocarbon binder.

6. A method according to claim 1, wherein said medium is a grouting having a base of a hydraulic binder.

7. A method according to claim 6, wherein said grouting contains fillers such as sands, gravels and clays.

8. A method according to claim 1, wherein said liquid less dense than water is a light hydrocarbon.

9. A method of laying a pipeline in a body of water, comprising the steps of enclosing a section of a pipeline within a ballast tube such that an intermediate space is created between the pipeline and the ballast tube, filling said intermediate space with a light hydrocarbon, lowering the assembly of said section of pipeline and ballast tube into the body of water with a free end of said assembly exposed above the surface of the body of water, inserting a plug into said free end, and securing as by welding an additional assembly of a pipeline section and a ballast tube to said free end on the side of the plug remote from the light hydrocarbon in said intermediate space.

10. A method according to claim 9, wherein said plug comprises at least one bung of foamed plastic.

11. A method according to claim 9, wherein said plug comprises a column of non-inflammable liquid.

12. A method according to claim 11, wherein said non-inflammable liquid consists of an aqueous suspension of plastic microspheres.

* * * * *